No. 762,717. PATENTED JUNE 14, 1904.
W. H. HOBSON.
KNIFE BLADE ATTACHMENT FOR CUTTING MACHINES.
APPLICATION FILED OCT. 23, 1903.
NO MODEL.
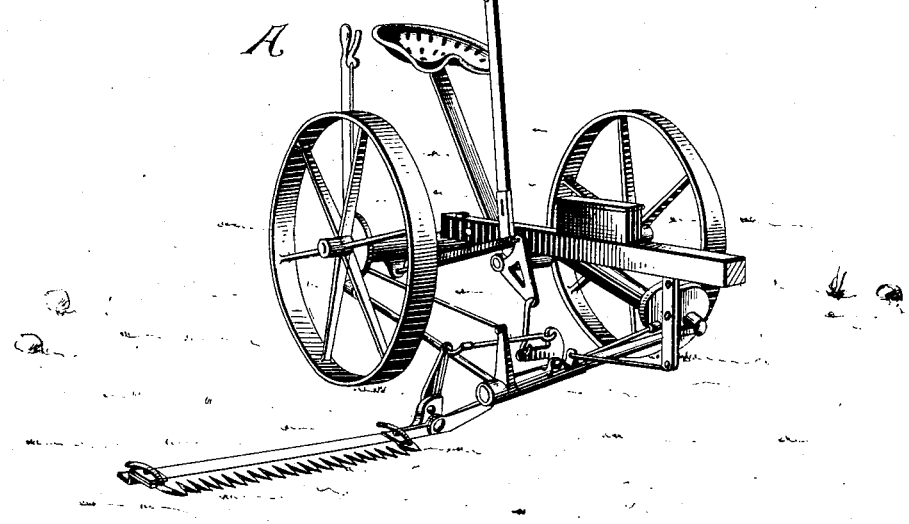
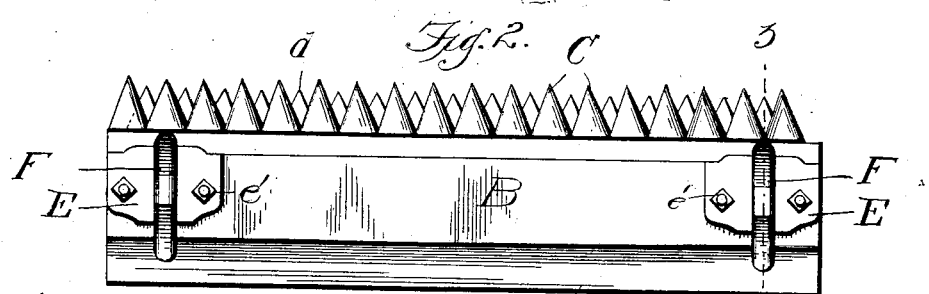
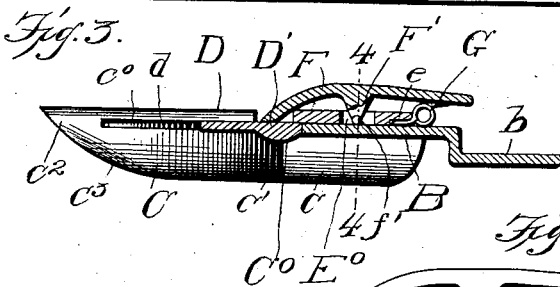
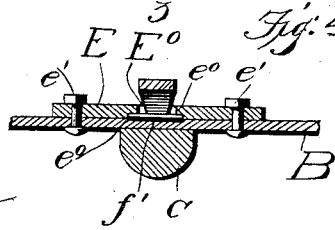
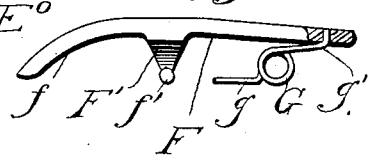
Witnesses
J. F. Patteson
Stephen Ginsta
Inventor
William H. Hobson
By Wilkinson & Fisher
his Attorneys.
THE NORRIS PETERS CO., PHOTO-LITHO., WASHINGTON, D. C.

No. 762,717. Patented June 14, 1904.

UNITED STATES PATENT OFFICE.

WILLIAM H. HOBSON, OF WICHITA, KANSAS.

KNIFE-BLADE ATTACHMENT FOR CUTTING-MACHINES.

SPECIFICATION forming part of Letters Patent No. 762,717, dated June 14, 1904.

Application filed October 23, 1903. Serial No. 178,221. (No model.)

*To all whom it may concern:*

Be it known that I, WILLIAM H. HOBSON, a citizen of the United States, residing at Wichita, in the county of Sedgwick and State of Kansas, have invented certain new and useful Improvements in Knife-Blade Attachments for Cutting-Machines; and I do hereby declare the following to be a full, clear, and exact description of the invention, such as will enable others skilled in the art to which it appertains to make and use the same.

My invention relates to improvements in spring-clips, and especially designed as an attachment for mowers, harvesters, and like machines used for cutting grass and grain. In machines of this character wherein reciprocating knives are used the knife while working wabbles between the guards to such an extent as to prevent the grass or grain from being cut clean and allows the grain or other material to clog in between the knife and guards—a great inconvenience and causing the knife to dull more rapidly.

The object of this invention is to overcome this difficulty by providing an arrangement for securely holding the knife in position with respect to the finger-bar and at the same time allowing the knife to be freely reciprocated.

To more fully describe the invention, reference is had to the accompanying drawings, illustrating the same, wherein—

Figure 1 represents in perspective a mowing-machine with my attachment applied thereto; Fig. 2, a detail plan view of the improved arrangement; Fig. 3, a transverse section on the line 3 3 of Fig. 2; Fig. 4, a section on the line 4 4 of Fig. 3, the pivot-pin and trunnion being shown in elevation; and Fig. 5, a side elevation of the spring-clip with a part broken away.

A represents a mowing or other similar machine of the usual construction provided with any suitable means for raising and lowering the finger-bar and knife and for reciprocating the knife-blade.

B is the finger-bar, comprising a flat metallic plate bent, as at $b$, at its rear end, as shown in Fig. 3, and provided with a plurality of fingers or guards C, extending along its forward edge and secured in any suitable manner to the underneath face of the finger-bar or formed integral therewith. These fingers or guards may be of any suitable construction; but in the drawings I have illustrated them as comprising the shank portion $c$, enlarged at its forward end, forming the shoulder $c'$ and extending forwardly at an angle forming the tapering finger or guard portion $c^2$, the forward underneath surface of which is curved or beveled upwardly, as at $c^3$, and the top portion slotted, as at $c^0$, for forming a guideway for the reciprocating knife-blade. At the joinder of the shoulder portion $c'$ with the shank $c$ there is provided the curved transversely-disposed recess $C^0$, adapted to receive a correspondingly-curved depending portion D', formed on the rear end of the reciprocating cutter-bar or knife-blade, and the shoulder $c'$ of one finger is adapted to abut against the shoulder of the adjacent finger for spacing the fingers or guards at their proper distances apart.

The reciprocating cutter-bar D, provided with the cutter-blades $d$, is of substantially the same construction as heretofore used, with the exception that the rear underneath face thereof is provided with the depending curved portion D', heretofore referred to, the rear edge of the cutter-bar being adapted to rest snugly against the forward edge of the finger-bar B and the forward edge or cutting-blades $d$ being adapted to operate transversely through the slots $c^0$, above mentioned.

At each end of the finger-bar, on the top surface thereof, is located a guard-plate E, centrally apertured, as at $E^0$, and provided on its underneath face with the recesses $e^0$ adjacent said apertured portion, and forming, with the finger-bar B, a bearing for the pivot-pin of the spring-clip. The guard-plate E is secured to the finger-bar in any suitable manner—as, for instance, by bolts $e'$. The front edge of this guard-plate E projects over the front edge of the finger-bar B and forms therewith a guiding-shoulder for the rear edge of the reciprocating knife, as shown in Fig. 3, the rear underneath face of said guard-plate being grooved, as at $e$, to receive the ends of a spring pressing upwardly on the rear end of the clip hereinafter mentioned.

F is a clip comprising a metallic plate bent downwardly at its forward end, as at $f$, and having a central depending trunnion F', provided at its base with the transverse pivot-pin $f'$, adapted to be journaled in the recesses $e^0$, formed in the guard-plate E. When the knife-blade is placed in position on the finger-bar, the forward curved end $f$ of the clip is held in close contact with the upper surface of the knife-blade by the coil-spring G, the forward end $g$ of which extends in the recesses $e$ of the guard-plate E and the rear upper end $g'$ of which is suitably secured to the rear end of the clip. By this construction it will be obvious that the reciprocating knife-blade is held securely in position on the finger-bar, at the same time being allowed to freely reciprocate.

It is obvious that although I have only shown two of these spring-clips as being arranged at each end of the cutters there may be a plurality of them disposed longitudinally along the same, if desired, and other modifications might be made without departing from the spirit of my invention.

What I claim is—

In machines of the character described, the combination with the finger-bar, a reciprocating cutter-bar, and means for reciprocating the same, of a guard-plate on said finger-bar projecting at its forward end above said reciprocating cutter-blade, an aperture formed in said guard-plate, grooves cut on the underneath face of said guard-plate adjacent said aperture, and a spring-operated clip comprising a metallic plate curved downwardly at its forward end for engaging the upper face of said cutter-bar and provided with the centrally-depending trunnion having a transversely-disposed pivot-pin at the base thereof journaling in said grooves.

In testimony whereof I affix my signature in presence of two witnesses.

WILLIAM H. HOBSON.

Witnesses:
   Jno. D. Davis,
   M. W. Renfrew.